R. GRISWOLD.
SEED SOWING ATTACHMENT FOR CULTIVATORS.
APPLICATION FILED MAR. 29, 1910.
964,243.
Patented July 12, 1910.
2 SHEETS—SHEET 2.
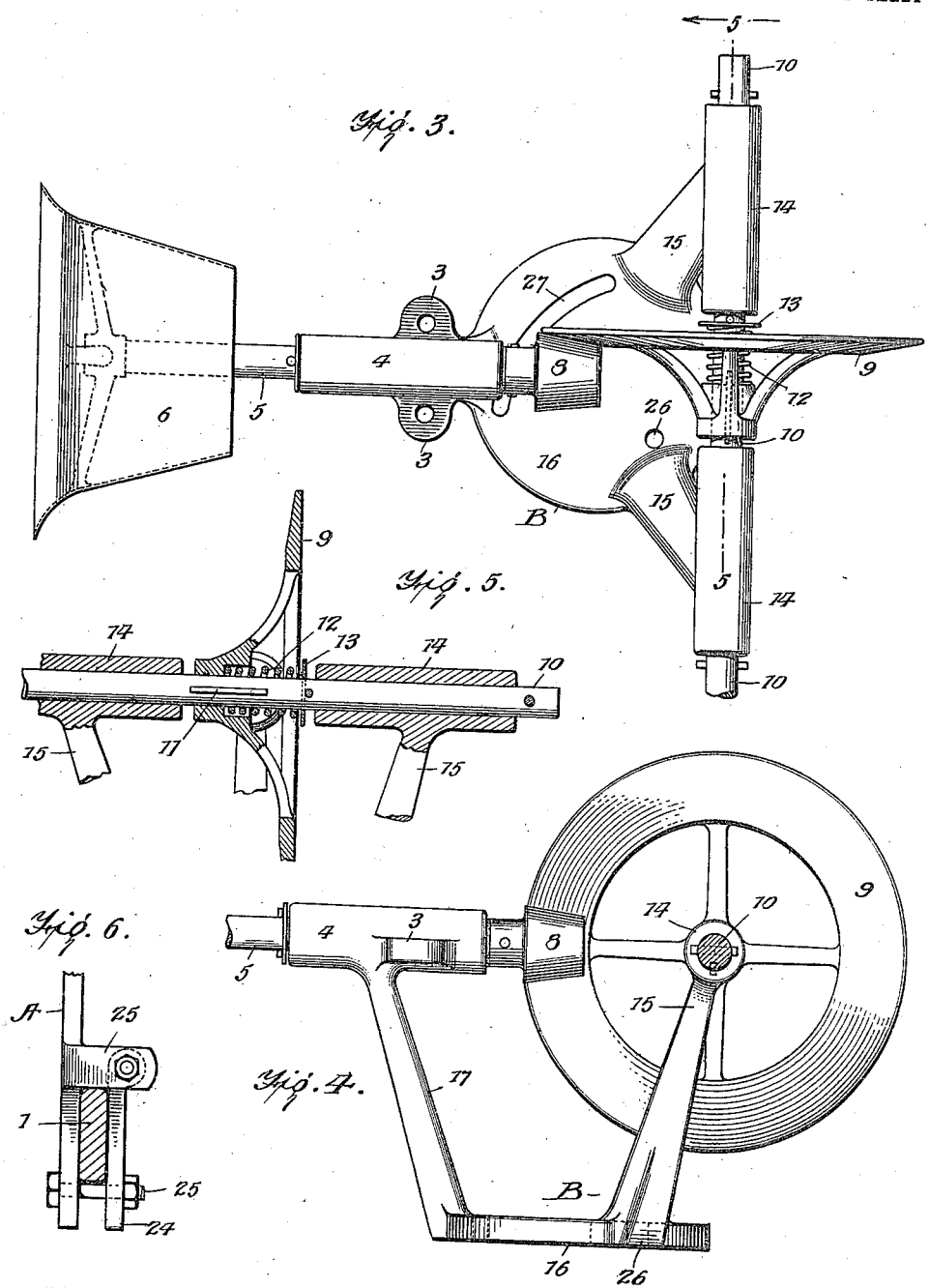
WITNESSES:
INVENTOR
ROBERT GRISWOLD,
BY
ATTORNEYS

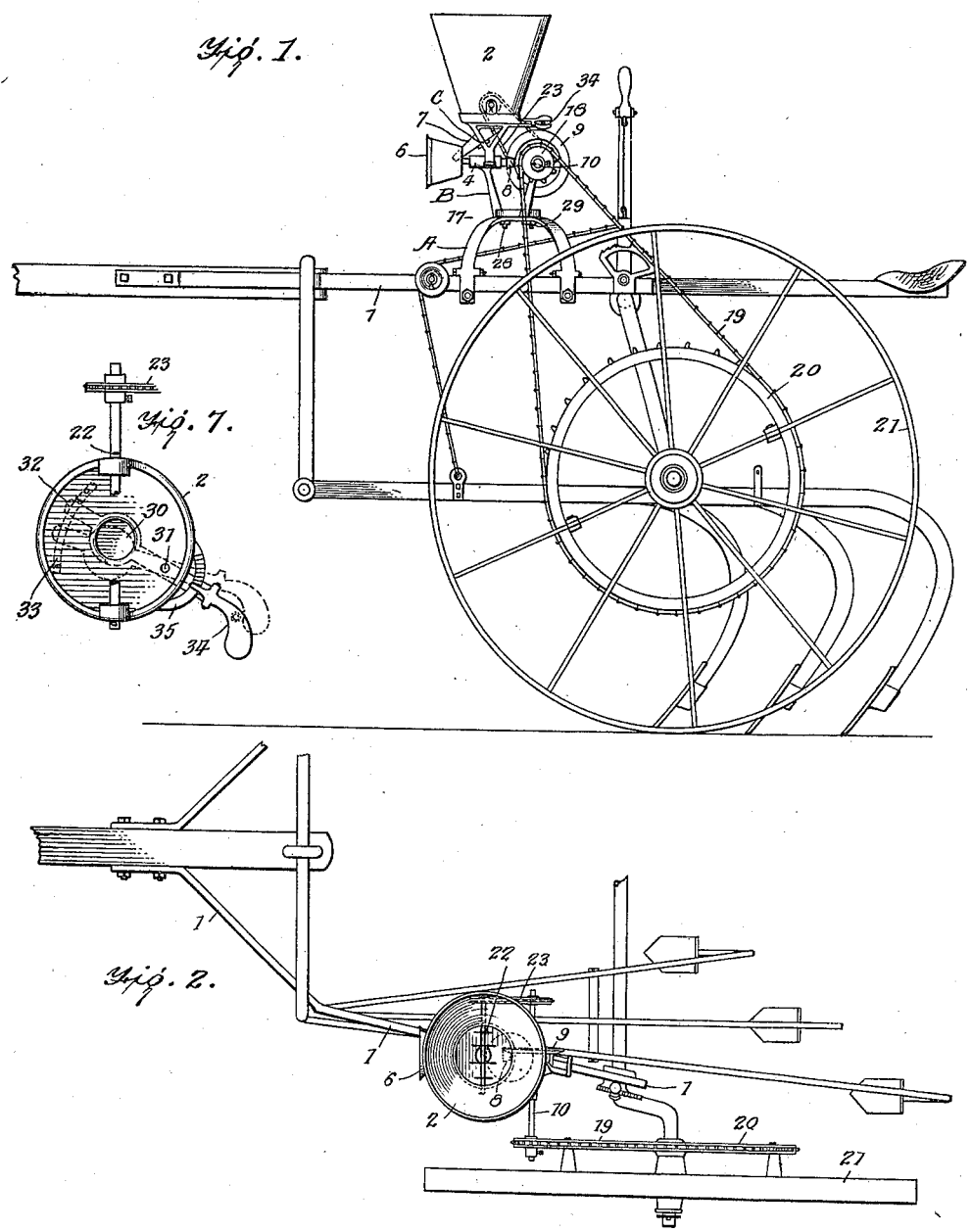

UNITED STATES PATENT OFFICE.

ROBERT GRISWOLD, OF LIVINGSTON, WISCONSIN.

SEED-SOWING ATTACHMENT FOR CULTIVATORS.

964,243.  Specification of Letters Patent. Patented July 12, 1910.

Application filed March 29, 1910. Serial No. 552,140.

*To all whom it may concern:*

Be it known that I, ROBERT GRISWOLD, a citizen of the United States, and resident of Livingston, in the county of Grant and State of Wisconsin, have invented an Improved Seed-Sowing Attachment for Cultivators, of which the following is a specification.

My invention is an apparatus adapted for easy attachment to and detachment from the frame of a cultivator or other wheeled machine, for use in scattering any small seed, such as rape, turnip, or grass seed, which is ordinarily sown at the last cultivation of the corn crop.

The attachment comprises a seed hopper, a seed-distributer proper, gearing for driving the latter and also for driving an agitator in the hopper, and frames supporting the hopper, seed-distributer, and gearing, as hereinafter described, and illustrated in the accompanying drawings, in which:

Figure 1 is a side elevation of a cultivator with my improved attachment applied thereto; Fig. 2 is a plan view of the same; Fig. 3 is a plan view of the seed-distributer, the friction gearing for driving the same, and the frame supporting them; Fig. 4 is mainly a side elevation of the large friction gear and its bearing; Fig. 5 is a vertical section taken through the center of the large friction gear and the bearing; Fig. 6 is a view illustrating the clamp for securing the attachment to the cultivator frame; and Fig. 7 is a plan view of the seed hopper with attachments.

As shown in Fig. 1, a flat bar constructed to form an arch A is clamped on the cultivator bar or part of the frame indicated by 1, and upon it is supported a frame B, which in turn supports another frame C, carrying the seed hopper 2. The frame A is U-shaped and its lower portions rest upon and are bolted to lugs 3 (see Figs. 3 and 4) forming integral portions of a bearing 4 in which the shaft 5 of the seed-distributer 6 is supported. The frame B, see especially Fig. 4, is in turn bolted upon the flat top of the arch A. A spout 7, see Fig. 1, conveys seed from the hopper into the seed-distributer 6 which has the form of a hollow truncated cone arranged horizontally. On the rear end of said shaft is mounted a conical friction pinion 8, which is in frictional engagement with the wheel 9 mounted slidably on the transverse shaft 10 arranged at right angles to the seed-distributer shaft 5.

As shown in Fig. 5, the hub of the wheel 9 slides on a feather 11, and its beveled rim is held pressed against the pinion 8, with the requisite force, by means of a spiral spring 12, which encircles the shaft 10 and bears against the hub of the wheel at one end, and at the other end against a disk 13 which is held in place on the shaft 10 by means of a cross pin. The shaft 10 rotates in bearings 14, which are cast integrally with vertical arms 15 which are cast integrally with the circular base 16 that forms the bottom of the frame B. A third arm 17, see Figs. 1 and 4, is cast integrally with the base 16 and bearing 4 of the seed-distributer shaft 5, for the purpose of driving the shaft 10, and thereby driving the seed-distributer shaft 5, through the medium of the friction gearings 8, 9. A sprocket 18, see Fig. 1, is mounted on the shaft 10, and a chain 19 runs therefrom to a large sprocket wheel 20, that is fixed on the hub or otherwise rigidly connected with one of the driving wheels 21 of the cultivator.

Within the hopper 2 is arranged an agitator 22, consisting of a transverse shaft having a series of radial points or arms, such shaft having its bearings in the sides of the hopper, as will be understood from Figs. 1 and 7. This agitator shaft is operatively connected with the shaft 10 carrying the friction gear 9 by means of sprocket gearing 23; see Fig. 1. It will be understood that this gearing is applied to the end of the shaft 10 which is opposite the one where the sprocket wheel 18 is clamped. The hopper 2 being filled with seed and the cultivator drawn along, it is apparent that the agitator in the hopper and the seed-distributer will be simultaneously rotated, and thus seed will be distributed broadcast.

As a convenient means for detachably securing the main portion of the attachment to the cultivator bar 1, I propose to employ any preferred form of clamp; in Figs. 1 and 6 I illustrate a convenient form, the same consisting of a plate 24, which is hinged between horizontal ears 25 formed integrally with the arch A, and through whose lower ends passes a bolt 25 that serves to clamp the bar 1 between the adjacent parts. It will be seen that the main attachment consisting of the frames A, B, C, together with the hopper, seed-distributer, and gearing, may all be easily and quickly attached to and detached from the cultivator frame. It is also apparent that the frames A, B, C, may be easily detached from each other, and that the whole attachment may be cheaply constructed since each of the frames may be cast by itself.

The frame bar 1 of the cultivator is shown in Fig. 2 as inclined to the plane of the driving wheel 21, and its inclination may vary in different machines; and it is therefore necessary to provide for adjustment of the attachment in a horizontal plane so that the shaft 5 of the seed-distributer may be in a plane parallel to that of the wheel; otherwise the supporting gearing would not operate successfully. I therefore provide a circular base 16 of the frame B with a bolt hole, as indicated at 26, Fig. 3, and with an arc slot 27 as indicated in the same figure. As shown in Fig. 1, a bolt 28 passes through the slot, and another bolt 29 through the hole 26. The latter bolt thus serves as a pivot on which the enter frame B of the attachment may be swung or adjusted right or left, and the bolt 28 serves as a clamp for holding the base 16 fixed in any adjustment.

I provide the hopper 2 with a device for regulating the seed-discharge, the same consisting, as shown in Fig. 7, of a disk 30, which is pivoted at 31 to the top of the frame C, that constitutes the bottom of the hopper, one of whose extensions 32 works in an arc-shaped guide 33 while the other extension is a handle provided with a spring catch 34. The disk 30 may be swung right or left, to open the seed discharge more or less, or to close it entirely. As shown in Fig. 7, the catch engages an arc rack-bar 35.

I claim:

1. A seed-sowing attachment comprising a support adapted for attachment to a wheeled carrying frame, a seed hopper, a seed-distributer arranged horizontally, and gearing for driving the latter, frames supporting and rigidly connecting the hopper, the seed-distributer, and the aforesaid support, and sprocket gearing for operatively connecting the seed-distributer with a driving wheel, substantially as described.

2. A seed-sowing attachment for a cultivator bar comprising a U-shaped bar provided with means for clamping it to the bar, a frame supported thereon, a seed-distributer having a horizontal shaft provided with bearings in said frame, friction gearing also supported in the frame, and a seed hopper and a supporting frame rigidly attached to the first-named frame, substantially as described.

3. The combination with a wheeled carrying frame, and a support fixed thereon, of a seed-sowing attachment comprising a hopper, a seed-distributer, driving gearing, and sprocket connection with the wheel of the frame, the frame supporting the seed-distributer and gearing being provided with a base having a pivot, and means for securing the base in any horizontal adjustment on the pivot, substantially as described.

ROBERT GRISWOLD.

Witnesses:
F. B. RUNDELL,
HARRY J. RUNDELL.